(12) United States Patent
Kim

(10) Patent No.: US 6,477,367 B1
(45) Date of Patent: Nov. 5, 2002

(54) SYSTEM AND METHOD FOR IDENTIFYING HOT SPOTS IN THE D-AMPS WIRELESS SYSTEM

(75) Inventor: Shawn Kim, Wylie, TX (US)

(73) Assignee: Ericsson Inc., Reseach Triangle Park, NC (US)

( * ) Notice: Subject to any disclaimer, the term of this patent is extended or adjusted under 35 U.S.C. 154(b) by 0 days.

(21) Appl. No.: 09/434,083

(22) Filed: Nov. 5, 1999

(51) Int. Cl.$^7$ .................................................. H04Q 7/20
(52) U.S. Cl. ......................... 455/423; 455/444; 455/446
(58) Field of Search ................................. 455/423, 424, 455/432, 434, 436, 439, 443, 444, 446, 449, 453, 422, 445, 512, 513, 67.4, 67.1; 370/237, 331, 332

(56) References Cited

U.S. PATENT DOCUMENTS

| | | | | |
|---|---|---|---|---|
| 5,325,426 A | * | 6/1994 | Held ............................ | 379/337 |
| 5,499,386 A | * | 3/1996 | Karisson ..................... | 455/446 |
| 5,946,612 A | * | 8/1999 | Johansson ................... | 455/405 |
| 5,983,107 A | * | 11/1999 | Hayashi et al. ............. | 455/446 |
| 5,987,322 A | * | 11/1999 | Gupta et al. ................ | 455/432 |
| 6,094,581 A | * | 7/2000 | Fried et al. ................. | 455/449 |
| 6,151,309 A | * | 11/2000 | Bsuioc et al. .............. | 370/328 |
| 6,205,336 B1 | * | 3/2001 | Ostrup et al. .............. | 455/444 |
| 6,208,862 B1 | * | 3/2001 | Lee ............................. | 455/442 |
| 6,223,031 B1 | * | 4/2001 | Naslund .................... | 455/423 |

* cited by examiner

Primary Examiner—Dwayne Bost
Assistant Examiner—Jean A Gelin
(74) Attorney, Agent, or Firm—Jenkens & Gilchrist, P.C.

(57) ABSTRACT

The present invention is a system and method to provide a scientific and quantitative measurement in finding optimal locations for placing new micro or pico cells. Signal strength information of a test transmitter measured by mobile stations is reported to a base station serving a macro cell via call quality messages that the mobile stations are located. A post-processing tool 330 counts the number of call quality messages having a signal strength level measured from the test transmitter above a threshold during a measuring period indicating that a call can be offloaded to the new micro or pico cell. The estimated offloaded traffic volume is then calculated, preferably in Erlangs.

25 Claims, 5 Drawing Sheets

| POWER (dBm) | COUNT |
|---|---|
| −90 | 2253 |
| −91 | 1999 |
| −92 | 1843 |
| −93 | 1427 |
| −94 | 1209 |
| −95 | 369 |
| TOTAL COUNT ABOVE THRESHOLD | 7522 |

FIG. 6

SYSTEM AND METHOD FOR IDENTIFYING HOT SPOTS IN THE D-AMPS WIRELESS SYSTEM

BACKGROUND OF THE PRESENT INVENTION

1. Field of the Invention

The present invention is generally related to cellular communication systems, and specifically to digital advanced mobile phone service (D-AMPS) cellular communication systems operating on an IS-54B or an IS-136 air interface standard.

2. Description of the Related Art

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

As traffic volume in cellular communication systems has been increasing dramatically, this increase in traffic volume causes subscribers to receive busy signals when trying to access the cellular communication system and to be dropped from the cellular communication system.

To alleviate congestion problems caused by high traffic volume residing on macro cells in a cellular communication system, micro and pico cells are introduced in the macro cells. As is understood to those skilled in the art, hot spots or small areas where high traffic volume congregates are usually time dependant, and are a main cause of call drops and unsuccessful setups. By adding micro and pico cells to the cellular communication system or network, the traffic congestion found in the hot spots may be offloaded from macro cells having high traffic volume to new micro or pico cells added to the system. When adding new micro and/or pico cells, a careful determination needs to be made as to the location to place the new micro and/or pico cells so that a maximum amount of traffic volume can be offloaded from the macro cell. At present, the method for finding the optimal locations to offload the maximum traffic volume from existing macro cells is rather subjective.

Typical cellular communication system operators rely on non-scientific information, such as visual inspections and customer complaints, of the suspected areas in order to determine the congestion locations. The cellular communication system operators further use the non-scientific information to determine locations for placing new micro or pico cells to resolve the traffic congestion. However, these non-scientific information sources are highly speculative and do not provide any quantitative analysis to determine an optimum or best location for placing the new micro or pico cells.

SUMMARY OF THE INVENTION

The present invention is a system and method to provide a scientific and quantitative measurement in finding optimal locations for placing new micro or pico cells. Signal strength information of a test transmitter measured by mobile stations is reported to a base station serving a macro cell that the mobile stations are located. The signal strength information is reported via call quality messages (CQM). Once the base station receives the call quality messages, a post-processing tool counts the number of call quality messages during a measuring period having a signal strength level measured from the test transmitter above a threshold indicating that a call can be offloaded to the new micro or pico cell. An estimated offloaded traffic volume is then calculated, preferably in Erlangs.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 6 is an exemplary signal strength table for a sample period of a test transmitter.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
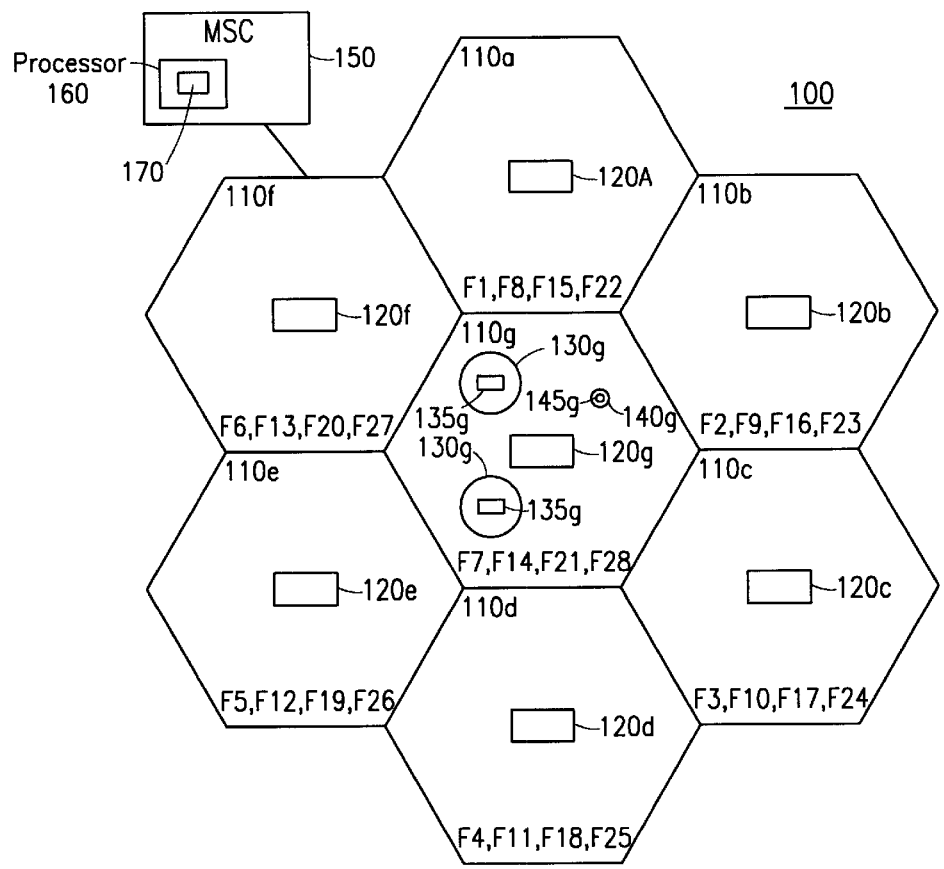
FIG. 1 is a representative communication system having seven macro cells, two micro cells, and one pico cell.

FIG. 1 is a representative communication system 100 having seven macro cells 110a–110g. Serving each of the macro cells 110a–110g are macro base stations 120a–120g, respectively.

The representative communication system 100 preferably employs a 7/21 frequency reuse plan, which is commonly known in the field of cellular communications. As shown, each macro cell 110a–110g supports four different frequencies that are spaced twenty-one frequencies apart to reduce interference from adjacent cells. For instance, macro cell 110g supports frequencies F21, F42, F63, and F84, while none of the surrounding cells contain any of the same frequencies.

In addition to the representative communication system 100 having seven macro cells 100a–110g, two micro cells 130g are shown located in macro cell 1110g. Each micro cell 130g has its own micro base station 135g to serve subscribers within the domain of the respective micro cell 130g. With further reference to FIG. 1, macro cell 110g also contains a pico cell 140g, which is served by a pico base station 145g. It should be understood that the terms "micro" and "pico" base stations do not indicate the physical size of the base stations, but simply are indicative of the cell size that they serve. For instance, a micro cell 130g may serve a few blocks in a city and a pico cell 140g may serve a single building.

A mobile switching center (MSC) 150 is connected to each base station 120a–120g serving the macro cells 110a–110g. Each cell route and name are defined and stored in the MSC 150. Subscribers of the cellular communication system 100 communicating with the base stations 120a–120g are managed by the MSC 150.

The MSC 150 includes a processor 160 that operates a post-processing tool 170. The processor 160 receives information from each base station 120a–120g in communication with the MSC 150. The operation of the post-processing tool 170 is described hereinafter in conjunction with FIG. 3.

Figure 2:
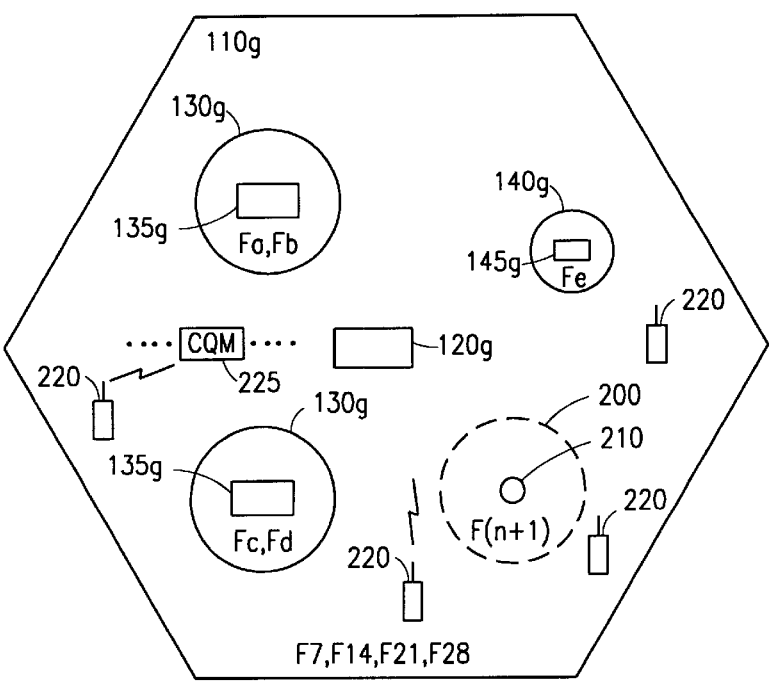
FIG. 2 is a representative macro cell with two micro cells, one pico cell, and one virtual cell.

FIG. 2 further illustrates a representative macro cell 110g along with serving macro base station 120g. As shown in the figure, each micro cell 130g supports two frequencies $F_a$, $F_b$ and $F_c$, $F_d$, respectively. Pico cell 140g, in turn, utilizes frequency $F_e$. It should be understood that frequencies $F_a$–$F_e$ may be frequencies operating within the 7/21 reuse plan that are not being used by the macro cell 110g within which these micro and pico cells reside. Alternatively, frequencies $F_a$–$F_e$ may be frequencies not operating within the 7/21 frequency reuse plan.

With reference again to FIG. 2, a virtual cell 200 is a cell whose route and name are defined in the mobile switching center (MSC) 150. As implied by its name, the virtual cell 200 has no actual device connected to the MSC 150. The purpose of the virtual cell 200 is to represent a new cell (e.g., a micro or pico cell) in order to have mobile stations in the area recognize a test transmitter 210 serving the new cell and collect its signal strength. It should be noted that references to the term "new" cell is synonymous with either a "micro or pico" cell.

When defining the virtual cell 200 in the representative communication system 100, two actions are performed in the MSC 150. First, the control channel number of the virtual cell 200 is matched with the frequency number F(n+1) of the test transmitter 210. This frequency f(n+1) must follow the frequency reuse plan to avoid causing interference. In a case where the hot spot is near the border of an adjacent macro cell (e.g., 110a or 110f), the virtual cell should additionally be defined as a neighbor cell to the adjacent macro cell.

Second, the virtual cell 200 is defined as a neighbor cell of the macro cell 110g in which hot spots reside. Since IS-53B or IS-136 compatible mobile stations are capable of mobile assisted handoff (MAHO), all mobile stations 220 that are IS-54B or IS-136 compatible and being actively served by the base station 120g recognize the virtual cell 200 from a neighbor cell list and measure the signal strength of the control channel F(n+1) of the virtual cell 200.

Once the virtual cell 200 is defined in the cellular communication system 100, the test transmitter 210 can be set up in a proposed location for placing the new cell within the macro cell 110g. It should be understood that unlike other wireless system standards, such as global system for mobile communications (GSM), D-AMPS mobile stations 220 operating under the D-AMPS communication standard (i.e., IS-54B and IS-136) do not synchronize with neighbor base stations. Because a D-AMPS cellular communication system has short time slots (6.67 milliseconds/time slot), synchronization is not possible with the neighbor base stations.

Since no synchronization is needed between the D-AMPS mobile stations 220 and the base stations 110a–110g, mobile stations 220 do not verify the legitimacy of the virtual cell 200. Instead, mobile stations 220 merely measure the RF power of the frequency that is specified as the control channel of the virtual cell 200. The test transmitter 210 may therefore be any generic signal generator capable of transmitting either a continuous wave (CW) or a digital modulated signal within a frequency band selected for the test transmitter 210.

The test transmitter 210 setup at the proposed location of the new cell preferably has an RF signal having a frequency number F(n+1) that is matched by a control number associated with the virtual cell 200. When the mobile stations 220 initiate a call in the macro cell 110g, the mobile stations 220 receive the neighbor cell list that includes the virtual cell 200. Because the virtual cell 200 is included as part of the neighbor cell list, the mobile stations 220 that are active (i.e., while in conversation) automatically measures the signal strength of the test transmitter 210. The signal strength is then transmitted to the base station 120g via a call quality message (CQM) 225.

Figure 3:
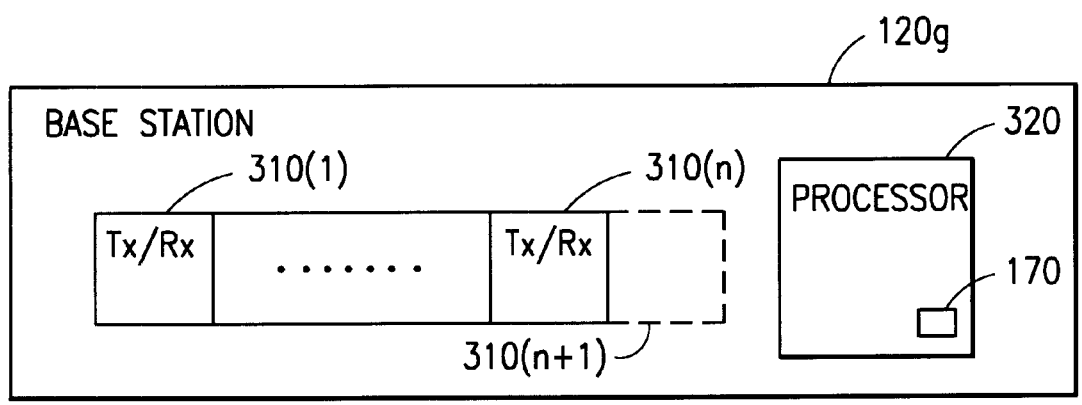
FIG. 3 is a representative base station.

FIG. 3 is a representative base station 120g having a plurality of transmitters/receivers 310(1)–310(n) for communicating with the mobile station 220. A symbolic transmitter/receiver (i.e., transceiver) 310(n+1) is shown in the base station. This symbolic transceiver 310 (n+1) is not an actual hardware component, but rather representative of the frequency used for the virtual cell 220.

The processor 160 in the MSC 150 contains the post-processing tool 170 therein. Alternatively, the post-processing tool 170 may be located in a processor connected to the base station 120g. The post-processing tool 170 includes at least one software routine operating to determine an estimated offloaded traffic volume from the cellular communication system 100, specifically for reducing the traffic volume at base station 120g, for example. Yet another embodiment of the post-processing tool 170 is a hardware device performing the same functionality as would the post-processing tool 170 operating on the processor 160.

With reference again to FIG. 2, the signal strength information of the test transmitter 210 measured by the subscriber stations 220 compatible with D-AMPS is reported to the base station 120g via the aforedescribed call quality messages 225. It should also be understood that the call quality message 225 is a part of the IS-54B and IS-136 air interface standard that reports various information, including downlink signal strength of neighboring macro cells 110a–110f of the macro cell 110g. Each mobile station 220 that is in active communication with the base station 120g preferably transmits one call quality message 225 per second to the base station 120g.

With reference again to FIGS. 1 and 2, the post-processing tool 170 operating on the processor 160 extracts the signal strength information of the test transmitter 210 out of the call quality message 225 received by the base station 120g and communicated to the MSC 150. To calculate the estimated offloaded traffic volume, the post-processing tool 170 counts the number of call quality messages 225 having a signal strength level measured from the test transmitter 210 above a threshold value during a measuring period. The threshold value is an indication that the signal strength level of the test transmitter 210 measured by the subscriber station 220 is at a high enough signal strength level of the test transmitter 210 whereby the call being handled by the subscriber station 220 that measured the signal strength level of the test transmitter 210 can be handed off to the new cell.

The total count or number of the call quality messages 225 reported having signal strength measurements above the threshold value is then divided by the measuring period or duration of time, measured in seconds, over which the call quality messages 225 were measured. Because one call quality message 225 is produced by one mobile station 220 per second, the result of the calculation produces the estimated offloaded traffic volume in Erlangs. Estimated offloaded traffic volume (Erlang)=N/T, where N=total number of CQM messages above a threshold signal strength value, and T=duration of measuring period in seconds.

Figure 4:
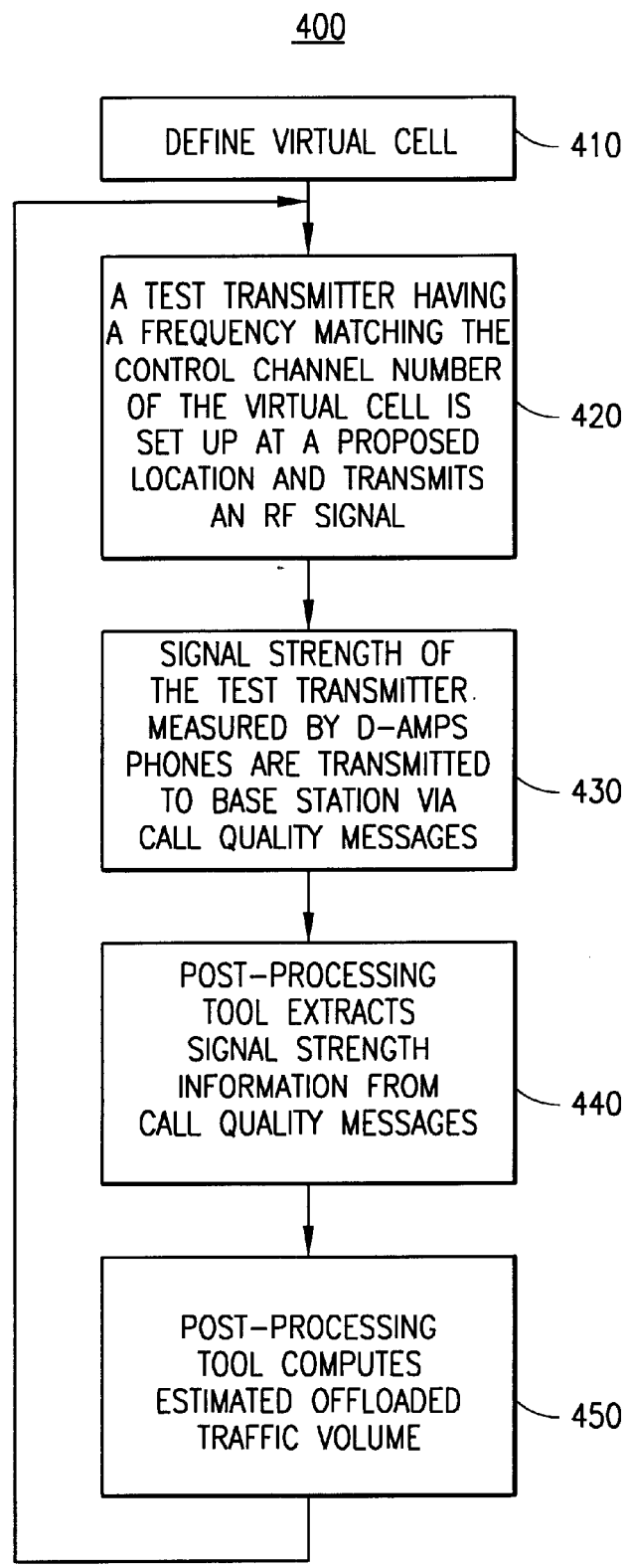
FIG. 4 is an exemplary flow diagram of the present invention generally describing an overall process for quantitatively determining cellular traffic volume at a proposed location within a macro cell.

FIG. 4 is an exemplary flow diagram of a methodology of the present invention generally describing an overall process at a high level. The process is used for quantitatively determining cellular traffic volume at a proposed location within a macro cell 110g. The steps shown in the exemplary flow diagram 400 indicate how an operator of the cellular communication system 100 utilizes equipment of the cellular communication system 100 in conjunction with test equipment (e.g., test transmitter 210).

At step 410, the virtual cell 200 is defined in the MSC 150 by (1) matching the control channel member of the virtual cell 200 to the frequency number F(n+1) of the test transmitter 210, and (2) defining the virtual cell 200 as a neighbor cell 110a–110f of the macro cell 110g being served by the base station 120g. By defining the virtual cell 200 as described above, all active mobile stations compatible with IS-54B and IS-136 in the coverage area of the macro cell 110g recognize the virtual cell 200 from the neighbor cell list.

At step 420, the test transmitter 210 is set up at proposed locations within the macro cell 110g where "hot spots" or high congestion areas are believed to exist. The test transmitter 210 generates either a continuous wave or a digital modulated signal at a certain frequency F(n+1)in the RF frequency range assigned to the test transmitter 210. The control channel number for the virtual cell 200 is matched with the frequency number of the test transmitter 210.

At step 430, the signal strength of the test transmitter 200 is measured by subscriber stations 220 that are D-AMPS compatible. The signal strength measurements measured by the subscriber stations 220 are transmitted to the base station 120g via call quality messages 225.

At step 440, the post-processing tool 170 operating in the processor 160 within or connected to the MSC 150 extracts the signal strength information from the call quality messages 225. The post-processing tool 170 then computes the estimated offloaded traffic volume in Erlangs based upon the received call quality messages 225 at step 450.

The operator of the cellular communication system 100 may continuously repeat steps 420 to 450 so as to determine the optimal location to place a new cell to help offload subscriber traffic volume within the macro cell 120g. It should be understood that the operator of the cellular communication system 100 performs the complete exemplary flow diagram 400 when first employing the present invention within a new macro cell 120a–120g.

Figure 5:
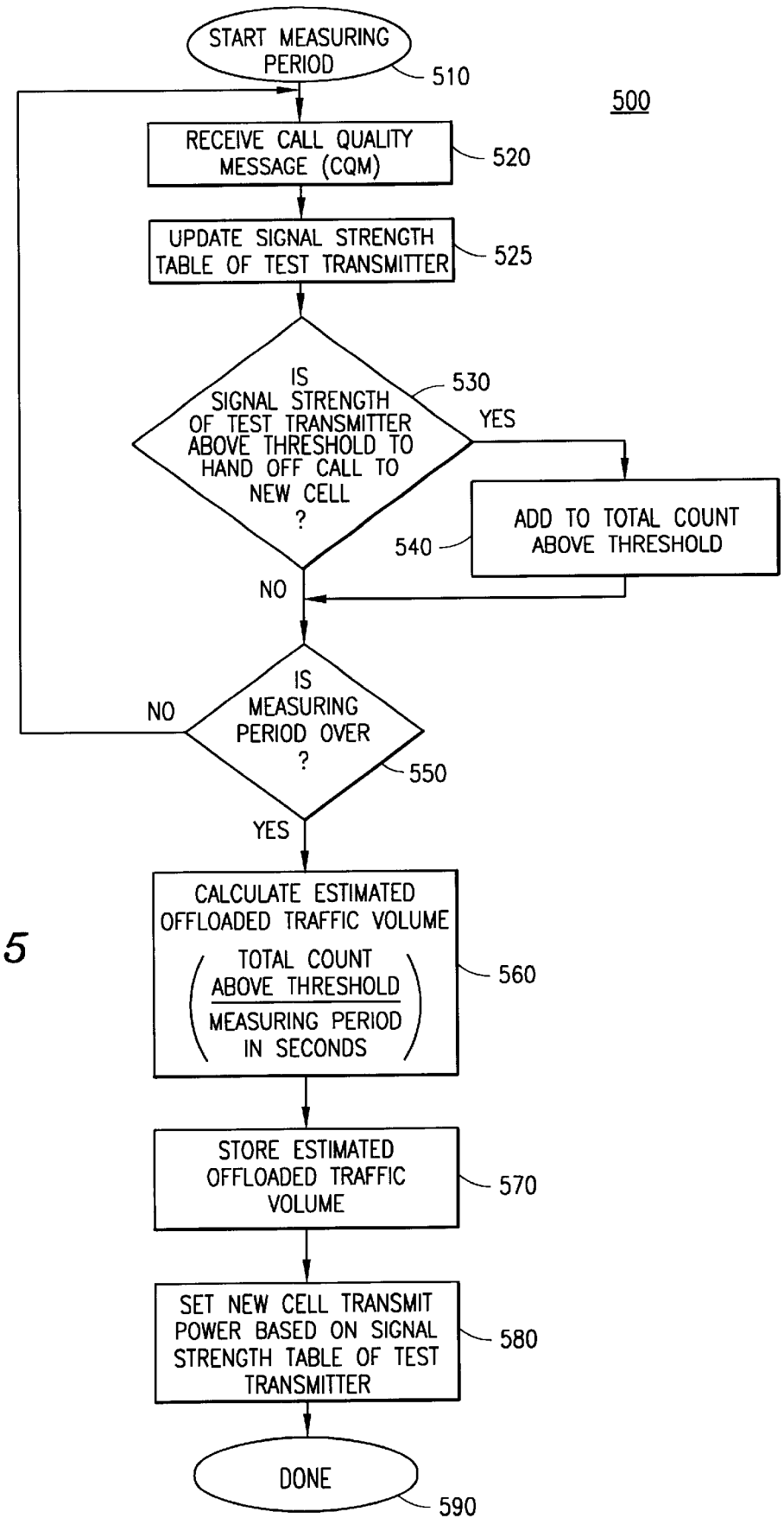
FIG. 5 is an exemplary flow diagram of one method for post-processing measured signal strength of the test transmitter.

FIG. 5 shows an exemplary flow diagram 500 of one method for post-processing the measured signal strength of the test transmitter 210. This is a more detailed embodiment of the post-processing steps shown in FIG. 4.

At step 510, the measuring period is started. At step 520, the base station 120g receives a call quality message 225 from the subscriber station 220. Again, the call quality message 225 contains the signal strength received at the subscriber station 220 from the test transmitter 210.

At step 525, the processor 160 updates a signal strength table containing signal strength measurements of the test transmitter 210. The signal strength table is hereinafter described in detail in FIG. 6.

At step 530, a decision is made to determine if the signal strength of the test transmitter 210 is above a threshold value so that the call can be handed off to a new cell. If the signal strength of the test transmitter 210 is above the threshold value, then a total count above the threshold value is increased by one at step 540, for instance. Otherwise, if the signal strength measurement contained in the call quality message 225 is below the threshold value, then nothing is added to the total count.

At step 550, a determination is made as to whether the measuring period is over. If the measuring period is not over, then the communication system 100 repeats steps 520–550 in order to continue the process of determining whether the proposed location of the new cell is suitable.

If the measuring period is over at step 550, then the post-processing calculation phase begins. At step 560, a calculation of the estimated offloaded traffic volume is made. This calculation is made simply by dividing the total count or number of call quality messages 225 having signal strengths above the threshold value during the measuring period by the measuring period (i.e., time duration) in seconds.

At step 570, the estimated offloaded traffic volume is stored for later review. At step 580, the processor 160 sets the new cell transmit power based on the signal strength table of the test transmitter 210. This setting may be performed by simply storing the transmit power level. At step 590, the process is done.

Figure 6:
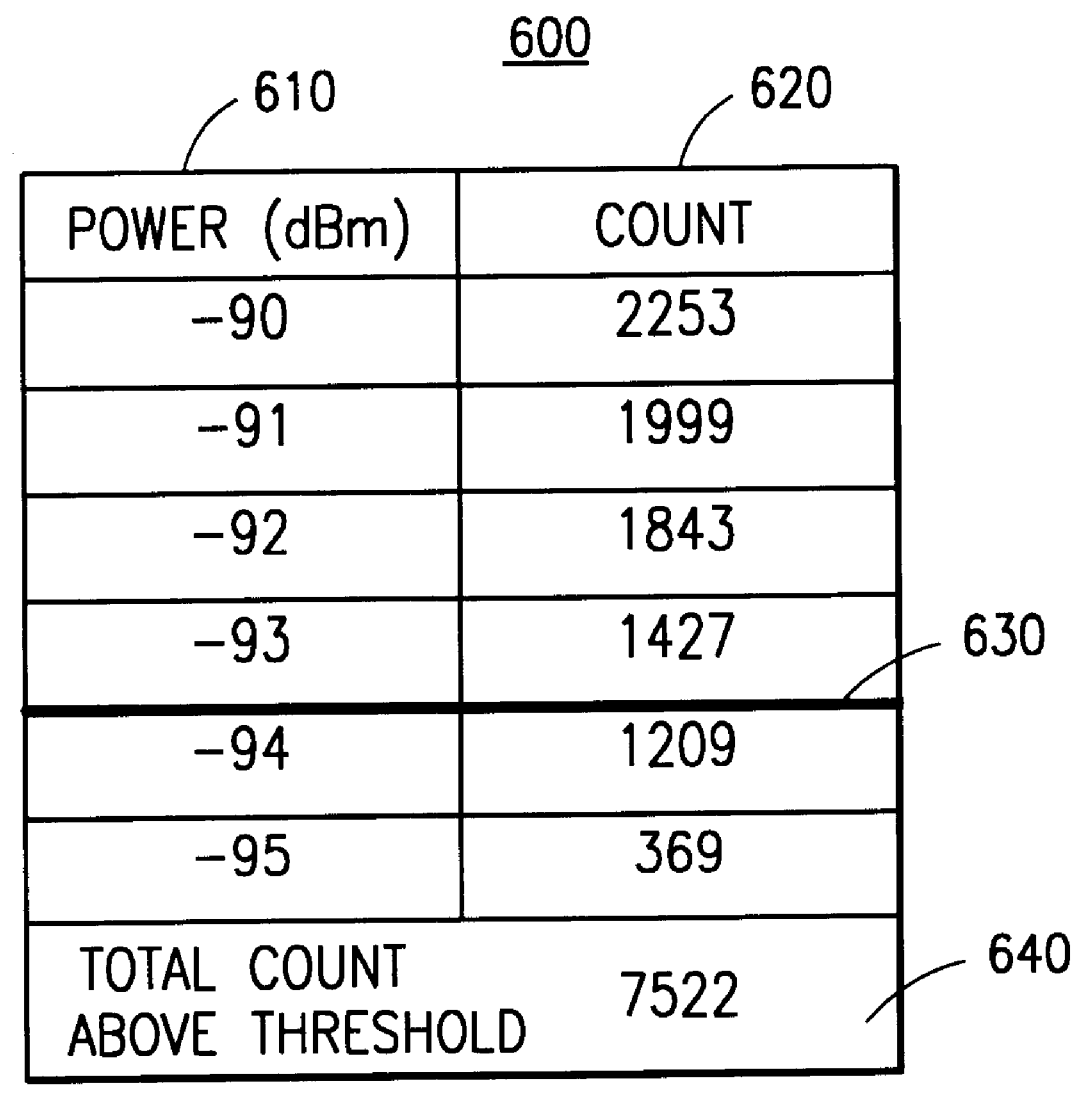

FIG. 6 shows an exemplary signal strength table 600 for a sample period of the test transmitter 210. The signal strength table 600 includes a measured power level column 610, a count column 620, and a total count 630. The measured power level column 610 comprises measured power levels of the test transmitter 210 that subscriber stations 220 measure. The count column 620 shows the number of call quality messages 225 containing the measured power level received by the base station 120g. For example, there are 1843 call quality messages received having a measured power level of the test transmitter 210 of −92 dBm. In the exemplary signal strength table 600, 93 dBm is the lowest acceptable power level for such a handoff.

The count column 620 shows the number of measurements at each measured power level within the measured power level column 610 of the signal transmitted by the test transmitter 210 at a certain transmission power level. A typical micro cell 130g transmission power level is one watt. The count values at each measured signal level shows generally the traffic volume at the location that the test transmitter 210 presently resides.

A threshold value 630 may be adjusted by the operator of the cellular communication system 100. The threshold value 630 is set above −94 dBm so that the counts for measured power levels above the threshold value 630 are added to the total count 640. The count values below the threshold value 630 are excluded for the total count 640, but may be later included if the operator lowers the threshold value 630. The threshold value 630 helps the operator determine the transmit power for the test transmitter 210, which, in turn, helps to determine the transmit power level for the new cell. The transmit power level of the new cell determines the traffic volume to be offloaded from the macro cell 110g.

The total count 640 generally indicates to the operator of the cellular communication system 100 the amount of traffic volume at a particular location that the test transmitter 210 presently resides. The total count 640 can be compared location-to-location to provide quantitative analysis so that the optimal location is selected to place a new cell.

An exemplary setting and adjusting technique for the power level for the new cell includes adjusting the power level of the test transmitter 210 until the total count 640 above the threshold value 630 reaches a minimum value, such as nine-thousand. In the case of FIG. 6, the test transmitter 210 must have its transmit power increased to raise the total count 640 above the minimum value. Once the minimum value for the total count 640 is met, the power level satisfying the condition may be saved to a storage device attached to the MSC 150 for later use.

The previous description is of a preferred embodiment for implementing the invention, and the scope of the invention should not necessarily be limited by this description. The scope of the present invention is instead defined by the following claims.

What is claimed is:

1. A method for determining high traffic regions of subscribers operating in a macro cell of a cellular communication system, said method comprising the steps of:

transmitting a signal from a test transmitter;

receiving a message containing signal strength information of said signal transmitted from said test transmitter;

setting a signal strength threshold value for the signal strength information to be compared; and processing said message in accordance with the signal strength threshold value to determine an estimated offloaded traffic volume for said cellular communication system, said processing including:

extracting said signal strength information from said message; and computing said estimated offloaded traffic volume, said computing including:

counting said call quality messages having said signal strength measurement above a threshold value into a total count, wherein any of said signal strength messages above said threshold value indicates that a given call is capable of being offloaded; and dividing said total count by a duration of time over which said step of counting is performed.

2. The method according to claim 1, further comprising the step of defining a virtual cell within said cellular communication system.

3. The method according to claim 2, wherein said step of defining further comprises the steps of:

matching a control channel number associated with said virtual cell to a frequency number related to said test transmitter; and defining said virtual cell as a neighbor cell to said macro cell.

4. The method according to claim 1, wherein said signal transmitted from said test transmitter is a continuous wave or a digital modulated signal.

5. The method according to claim 1, wherein said message is a call quality message.

6. The method according to claim 1, further including the step of:

updating a signal strength table by said signal strength information contained in said message.

7. The method according to claim 1, further comprising altering power of the transmitter based on the estimated offloaded traffic volume.

8. A cellular communication system for determining high traffic regions of subscriber stations operating in a macro cell of said cellular communication system, said cellular communication system comprising:

a test transmitter for transmitting a signal;

a receiver for receiving a message containing signal strength information of said test transmitter, said message being transmitted by said subscriber stations; and a processor for processing said message in accordance with a signal strength threshold value to determine an estimated offloaded traffic volume from said macro cell, said estimated offloaded traffic volume is computed on said processor by:

counting said call quality messages having said signal strength information above a threshold value into a total count, wherein any of said messages having signal strength information above said threshold value indicates that a given call is capable of being offloaded from said macro cell; and dividing said total count by a duration of time over which said step of counting is performed.

9. The cellular communication system according to claim 8, further comprising a virtual cell defined in said communication system.

10. The cellular communication system according to claim 9, said virtual cell having a control channel number matching a frequency number related to said test transmitter and said virtual cell further defined as a neighbor cell to said macro cell.

11. The cellular communication system according to claim 9, wherein said virtual cell is defined in a mobile switching center connected to said cellular communication system.

12. The cellular communication system according to claim 8, wherein said signal transmitted from said test transmitter is a continuous wave or a digital modulated signal.

13. The cellular communications system according to claim 8, wherein said message is a call quality message.

14. The cellular communication system according to claim 8, wherein said processor extracts said signal strength information from said message and computes said estimated offloaded traffic volume.

15. The system according to claim 8, further comprising a power adjuster coupled to said test transmitter for altering power of said test transmitter based on the estimated offloaded traffic volume.

16. The cellular communication system according to claim 8, wherein said processor is connected to a base station serving said macro cell.

17. The cellular communication system according to claim 8, further comprising a signal strength table, said signal strength table being updated by said signal strength information contained in said message.

18. A method for determining high traffic regions of subscribers operating in a macro cell of a cellular communications system, said method comprising the steps of:

receiving a definition of a virtual cell for said cellular communication system;

transmitting a signal having a frequency number matching a channel control number associated with said virtual cell;

setting a signal strength threshold value;

receiving at least one message containing signal strength information; and processing the at least one message in accordance with the signal strength threshold value to determine an estimated offloaded traffic volume of said subscribers, said processing further including:
- counting said at least one message having signal strength information above a threshold value to produce a total count, wherein said threshold value indicates that a call is capable of being handed off to a new cell; and
- computing said offloaded traffic volume by dividing said total count by a measuring period for said step of counting.

19. The method according to claim 18, further comprising the step of:

receiving said at least one message having signal strength information of said signal.

20. The method according to claim 18, wherein said virtual cell comprises a route and a cell name.

21. The method according to claim 18, further including the step of:

updating a signal strength table by said signal strength information contained in said message.

22. The method according to claim 18, further comprising altering power of said transmitting based on the estimated offloaded traffic volume.

23. A method for determining high traffic regions of subscribers operating in a macro cell of a cellular communication system, said method comprising the steps of:

transmitting a signal from a test transmitter;

receiving a message containing signal strength information of said signal transmitted from said test transmitter; and processing said message to determine an estimated offloaded traffic volume for said cellular communication system, said processing including:
- extracting said signal strength information from said message; and
- computing said estimated offloaded traffic volume, said computing including:
  - counting said call quality messages having said signal strength measurement above a threshold value into a total count, wherein any of said signal strength messages above said threshold value indicates that a given call is capable of being offloaded; and
  - dividing said total count by a duration of time over which said step of counting is performed.

24. A cellular communication system for determining high traffic regions of subscriber stations operating in a macro cell of said cellular communication system, said cellular communication system comprising:

a test transmitter for transmitting a signal;

a receiver for receiving a message containing signal strength information of said test transmitter, said message being transmitted by said subscriber stations; and a processor for processing said message to determine an estimated offloaded traffic volume from said macro cell, said processor determining the estimated offload by:
- counting said call quality messages having said signal strength information above a threshold value into a total count, wherein any of said messages having signal strength information above said threshold value indicates that a given call is capable of being offloaded from said macro cell; and
- dividing said total count by a duration of time over which said step of counting is performed.

25. A method for determining high traffic regions of subscribers operating in a macro cell of a cellular communications system, said method comprising:

receiving a definition of a virtual cell for said cellular communication system;

transmitting a signal having a frequency number matching a channel control number associated with said virtual cell;

receiving at least one message containing signal strength information;

processing the at least one message to determine an estimated offloaded traffic volume of said subscribers, said processing including:
- counting said at least one message having signal strength information above a threshold value to produce a total count, wherein said threshold value indicates that a call is capable of being handed off to a new cell; and
- computing said offloaded traffic volume by dividing said total count by a measuring period for said step of counting.

* * * * *

UNITED STATES PATENT AND TRADEMARK OFFICE
CERTIFICATE OF CORRECTION

PATENT NO.   : 6,477,367 B1
DATED        : November 5, 2002
INVENTOR(S)  : Shawn Kim It is certified that error appears in the above-identified patent and that said Letters Patent is hereby corrected as shown below:

<u>Column 2,</u>
Line 63, replace "cell 1110g" with -- cell 110g --

<u>Column 6,</u>
Lines 44-45, replace "93 dBm" with -- -93 dBm --

Signed and Sealed this

Eighteenth Day of March, 2003

JAMES E. ROGAN
*Director of the United States Patent and Trademark Office*